United States Patent [19]

Fockens

[11] Patent Number: 5,072,222
[45] Date of Patent: Dec. 10, 1991

[54] ELECTROMAGNETIC IDENTIFICATION AND LOCATION SYSTEM

[75] Inventor: Tallienco W. H. Fockens, Eibergen, Netherlands

[73] Assignee: N.V. Nederlandsche Apparatenfabriek Nedap, De Groenlo, Netherlands

[21] Appl. No.: 544,019

[22] Filed: Jun. 26, 1990

Related U.S. Application Data

[63] Continuation of Ser. No. 352,647, May 12, 1989, abandoned, which is a continuation of Ser. No. 82,620, Aug. 7, 1987, abandoned.

[30] Foreign Application Priority Data

Aug. 8, 1986 [NL] Netherlands ............... 8602033

[51] Int. Cl.⁵ .................................... G01S 13/80
[52] U.S. Cl. ............................ 342/44; 342/42; 342/51
[58] Field of Search .................... 342/42, 44, 51

[56] References Cited

U.S. PATENT DOCUMENTS

| | | | |
|---|---|---|---|
| 3,149,421 | 9/1964 | O'Brien | 33/172 |
| 3,431,760 | 3/1969 | Martens | 72/9 |
| 3,737,911 | 6/1973 | Sakuragi et al. | 342/44 |
| 3,798,641 | 3/1974 | Preti | 342/44 |
| 3,801,733 | 4/1974 | Bailey | 178/19 |
| 3,816,709 | 6/1974 | Walton | 235/61.11 H |
| 3,984,835 | 10/1976 | Kaplan et al. | 342/44 |
| 4,167,007 | 9/1979 | McGeoch et al. | 342/44 |
| 4,177,466 | 12/1979 | Reagen | 342/44 |
| 4,242,661 | 12/1980 | Henoch et al. | 340/23 |
| 4,292,637 | 9/1981 | Johnson | 342/44 |
| 4,489,313 | 12/1984 | Pfister | 340/540 |
| 4,546,241 | 10/1985 | Walton | 235/380 |
| 4,551,725 | 11/1985 | Schaffer | 342/44 |
| 4,604,733 | 8/1986 | Brown et al. | 367/2 |
| 4,656,478 | 4/1987 | Leuenberger | 342/51 |
| 4,663,625 | 5/1987 | Yewen | 340/825 |
| 4,679,046 | 7/1987 | Curtis et al. | 342/6.5 |

FOREIGN PATENT DOCUMENTS 0084400 7/1983 European Pat. Off. .
2133660 7/1984 United Kingdom .

*Primary Examiner*—John B. Sotomayor
*Attorney, Agent, or Firm*—Fleit, Jacobson, Cohn, Price, Holman & Stern

[57] ABSTRACT

An electromagnetic identification and location system is described. The system comprises at least one interrogator which, in operation, generates an electromagnetic interrogation field by at least one antenna coil, and at least one responder which, in response to the electromagnetic interrogation field, generates a code signal in accordance with a binary code stored in a code circuit of the responder. The code signal can be recognized by an identifier. According to the invention, the responder is provided with a generator which, in response to the interrogation field, generates and transmits a pilot signal. The system further includes a position-sensitive antenna arrangement for receiving the pilot signal.

10 Claims, 4 Drawing Sheets

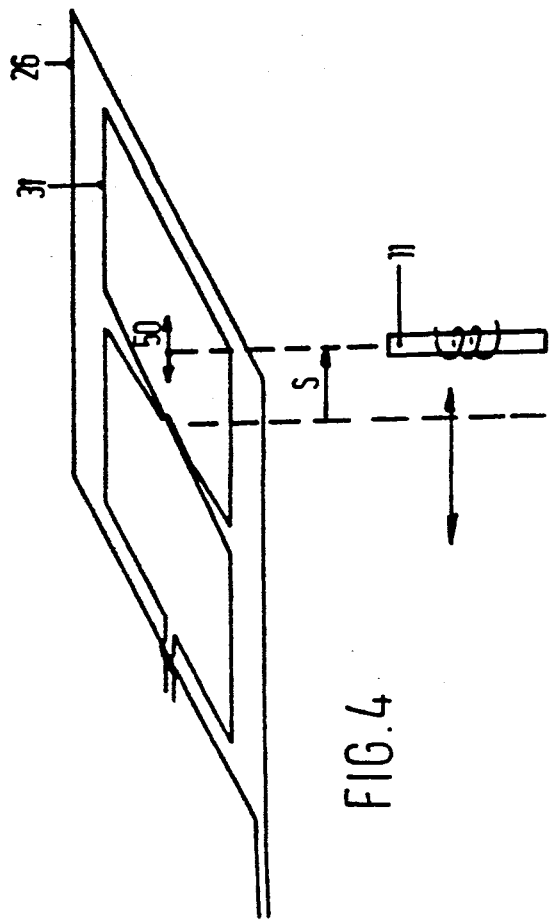
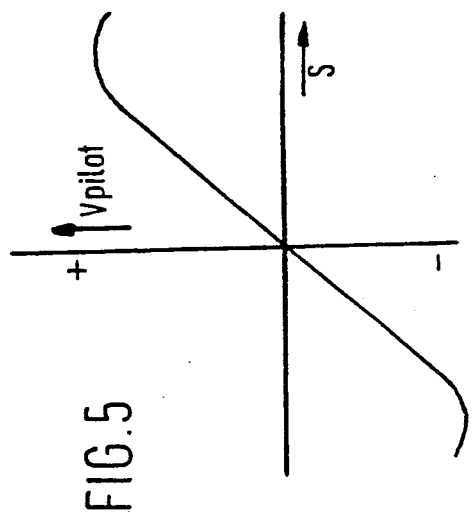
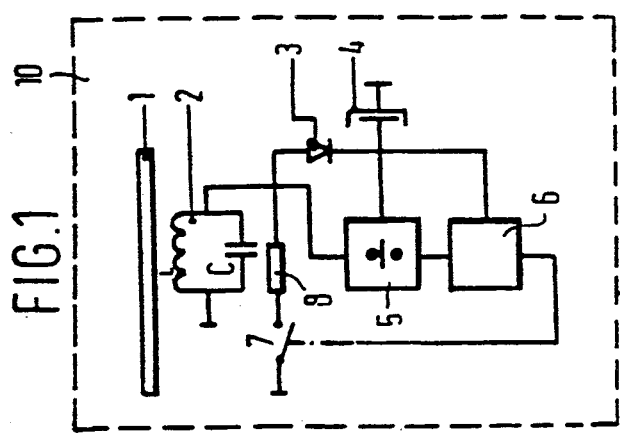
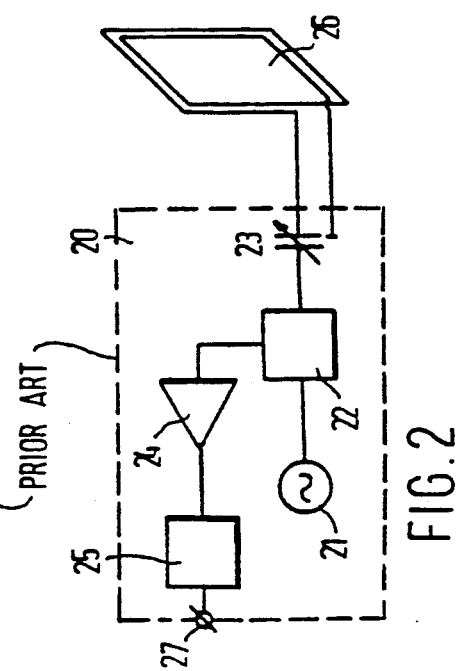

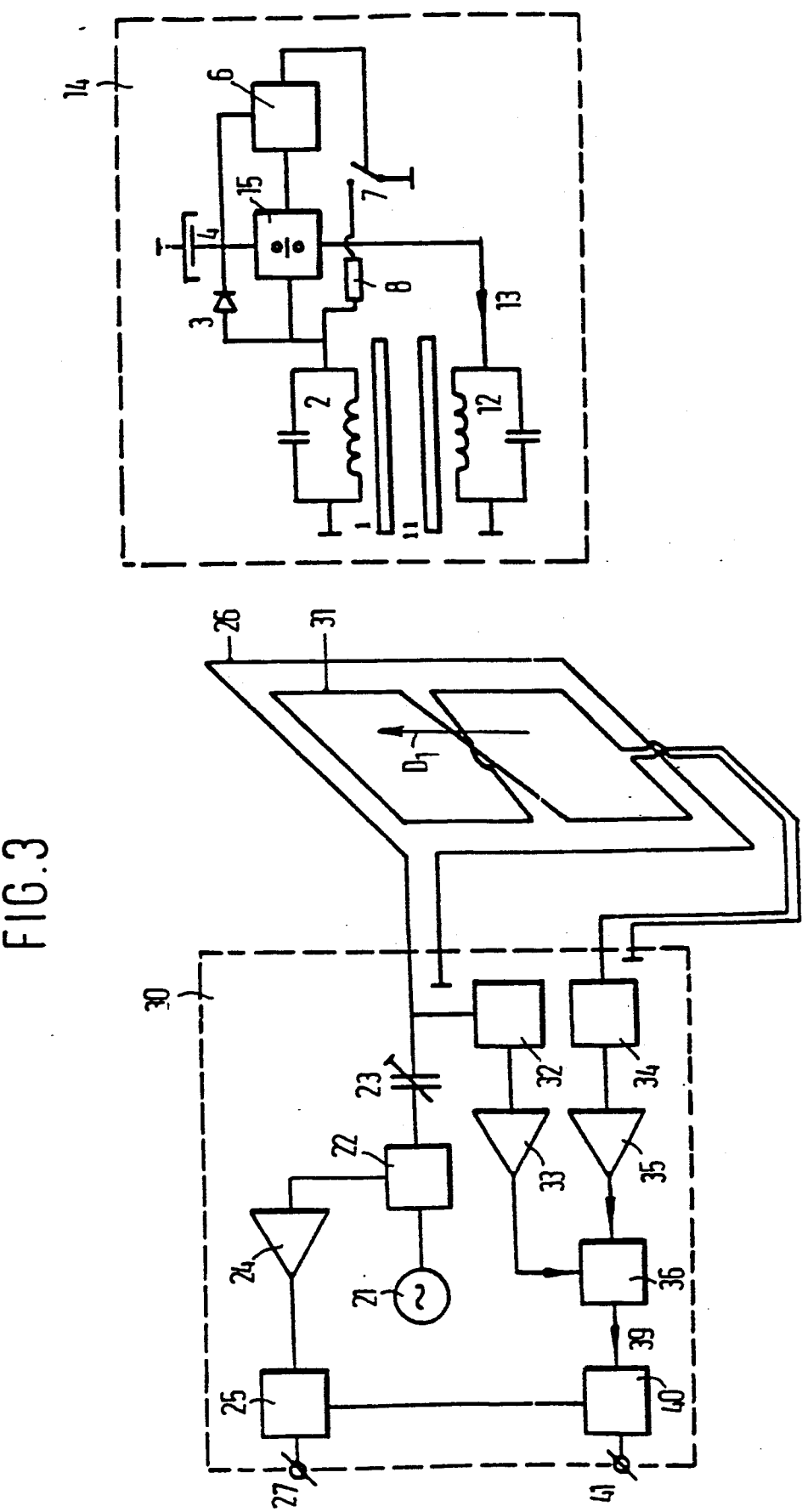

ELECTROMAGNETIC IDENTIFICATION AND LOCATION SYSTEM

This is a continuation of application Ser. No. 07/352,647, filed May 12, 1989 now abandoned, which in turn is a continuation of application Ser. No. 07/082,620, filed Aug. 7, 1987 now abandoned.

BACKGROUND OF THE INVENTION

1. Field of the Invention

This invention relates to an electromagnetic identification and location system, comprising at least one interrogator which, in operation, generates an electromagnetic interrogation field by means of at least one antenna coil; at least one responder which in response to the electromagnetic interrogation field generates a code signal in accordance with a binary code stored in a code circuit of the responder, which code signal can be recognized by detection means.

2. Description of Related Art

An electromagnetic identification system with an interrogator capable of generating an interrogation field and a plurality of responders comprising a code circuit in which a unique code is stored for each responder or group of responders, and in response to an interrogation field generating a coded signal which corresponds with the code recorded in the code circuit is known per se.

Such a system, and in particular a responder for such a system are described in Netherlands patent application No. 77,11891. The responder described in the Netherlands application is of the passive type, that is to say, the supply voltage required for the active parts of the responder circuit is derived from the interrogation field. For this purpose the responder comprises a receiver circuit attuned to the interrogation field, in which an A.C. voltage is induced by the interrogation field, which voltage, after being rectified, is supplied to the input terminals of the active circuits of the responder. The active circuits are one or more digital circuits which together form a code generator which, in operation, provides a binary code signal controlling a switch means. The switch means is in turn connected to the receiver circuit, in order to vary the resonance frequency of the receiver circuit and/or the damping of the receiver circuit in accordance with the rhythm of the code. The effect of this can be detected by a detector at the side of the interrogator as a variation of the load of the transmitting antenna. The detector may alternatively be a separate receiver.

The clock pulses required for the operation of the digital circuits are formed by a pulse generator, starting from the A.C. voltage signal in the receiver circuit. In the simplest case, the receiver circuit itself is the pulse generator, the A.C. signal being supplied via a resistor and/or a diode to the clock pulse input(s) of the digital circuits. The clock pulses are then of sinusoidal shape. Often, however, at least one pulse former is used, which converts the sinusoidal signals into signals having steeper edges. Such a pulse former may comprise a single transistor, which is provided with supply voltage in the same way as are the digital circuits.

The pulse generator may alternatively comprise a frequency divider or frequency multiplier, or an oscillator. In those cases, the clock pulse frequency differs from the frequency of the interrogation field.

A known field of application for such an identification system is animal husbandry where cows and other animals have to be recognized, for example, for selectively administering feed. A second field of application is access control, in which individuals entitled to enter carry an electronic label (responder) in the form of a badge, with the doors of the spaces to be safeguarded being opened by the detector, sometimes referred to as reader unit, after recognizing the code of the label. As the label is read at some distance (70 cm) from the door or wall, and the bearer of the label need not perform any separate action to gain access, such a system is referred to as a so-called "hands-free" system.

Another possible field of application resides in the automation of production processes. This is concerned with recognizing and controlling products and product carriers, or tools or tool carriers. An example is the Automatic Guided Vehicle System (AGV systems).

In such AGV systems, it is not only of importance to recognize the product carriers and/or tool carriers, in general the vehicles or carts, but location of the vehicle recognized is also desirable. In other cases, it is not the vehicle which must be identified, but the specific area in which the vehicle finds itself, as well as the exact location of the vehicle within the area identified.

SUMMARY OF THE INVENTION

There is accordingly a need for a system which makes possible both identification of a responder and location of a responder. It is noted that, owing to the mere fact that an interrogation field only has certain limited dimensions, roughly determined by the dimensions of the transmitting antenna, the detection and identification of a responder by themselves already involve a rough determination of the location. This rough location, however, is not very accurate. Deviations may be as much as 0.5 to 1 meter and more.

It is an object of the present invention to provide an electromagnetic identification and location system which makes possible a high precision in location and hence positioning. Depending on the particular form, an accuracy of one to several centimeters is possible.

According to the present invention, a system of the kind described is characterized in that the responder is provided with means which in response to the interrogation field generate and transmit a pilot signal, and that the system further comprises a position-sensitive antenna system for receiving the pilot signal.

BRIEF DESCRIPTION OF THE DRAWINGS

The invention will now be described in more detail with reference to the accompanying drawings. In said drawings, FIG. 1 shows diagrammatically an example of a prior art coded responder for an identification system;

FIG. 2 shows diagrammatically an interrogator of a prior art identification system;

FIG. 3 shows diagrammatically one embodiment of a system according to the present invention;

FIG. 4 shows the antenna arrangement of FIG. 3;

FIG. 5 shows the variation of a voltage appearing in the antenna arrangement during operation, in dependence upon the relative position of a responder;

DESCRIPTION OF THE PREFERRED EMBODIMENTS

Figure 6:
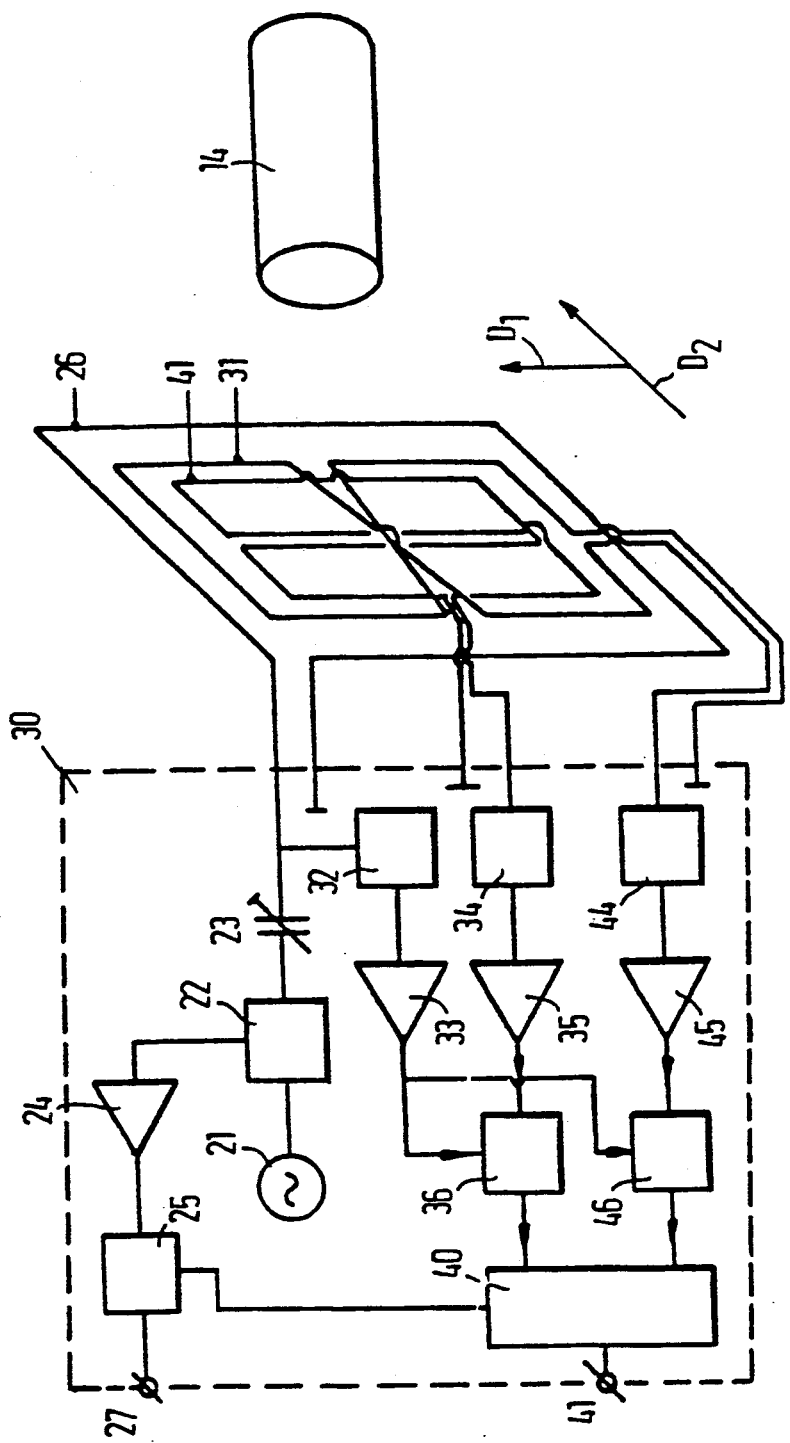
FIG. 6 shows a modification of the system of FIG. 3.

The starting point for the present invention is an existing coded responder of the type as described, for example, in Netherlands patent application No. 77,11891 FIG. 1 shows the basic diagram of such a coded label or responder 10. The responder comprises a resonance circuit 2 which, by virtue of being coupled magnetically or electrically to a primary transmission circuit, not shown in FIG. 1, can absorb energy from the primary A.C. field (i.e., the interrogation field). The secondary resonance circuit 2 cooperates in three ways with the further circuitry. First the induced A.C. voltage across the circuit is rectified with a rectifier 3, and a buffer capacitor 4 is charged, from which the entire circuitry is fed. Second, the A.C. voltage is supplied direct to a pulse generator 5, in this example a frequency divider, which divides the frequency of the interrogation field, e.g., 120 kHz, into a clock frequency with which a code circuit 6, which comprises the coding of the label, is serially read. The clock frequency may be, for example, 4 kHz. Third, the resonance circuit 2 is connected to an electronic switch 7, which heavily loads the circuit via a resistor 8 if the switch is closed. This switch is operated by the code signal issued by the code circuit 6, and this in such a manner that the switch is closed when the code signal has the binary value "1". The effect of closing the switch is that the circuit becomes damped, as a result of which the energy absorption from the primary field is decreased, and the losses in the primary transmission circuit are reduced. This last leads to a lower loss resistance of the transmission circuit, which can be detected. In this way, by switching the switch with the code signal, the code is transmitted to the interrogator, sometimes referred to as reader unit or transceiver. In the case of a so-called transmission system, a separate receiver is provided for detecting the code.

FIG. 2 shows the basic diagram of a reader unit. The reader unit or interrogator 20 comprises the following elements: a transmission signal source 21; a capacitor 23, with which the transmission coil 26 is tuned to the transmission frequency; a detector unit 22, which detects the modulation of the loss resistance of the transmission circuit; a signal amplifier and processor 24; and an identification unit 25, which from the signal received determines and identifies the code stored in a responder present in the interrogation field, and, in response to the identification, can undertake pre-programmed actions.

In order to realize the desired location functions of a system of the present invention, the responders of such a system are designed so that not only is a code signal generated in the interrogation field, but also a location signal, sometimes referred to as a pilot signal. For this purpose each responder is provided with means which are capable of receiving the interrogation field and, in response thereto, transmitting a response signal in any of the manners known per se for the purpose.

Basically, the means for receiving the interrogation field and forming a pilot signal can be fully independent of the responder circuitry shown in FIG. 1. In that case, a responder accordingly comprises two fully independently operable circuits: a first circuit for generating a code signal and a second circuit for generating a pilot signal.

Preferably, however, the two circuits are combined to a certain extent.

A first, obvious possibility of combination is to generate the pilot signal on the basis of the A.C. voltage induced in the resonance circuit 2 already present. This A.C. voltage can then be converted into an A.C. voltage of a different frequency, which is supplied to a transmitting circuit in the responder. The other frequency can be obtained by means of a frequency divider or multiplier, which can be provided with supply voltage by the rectifier 3, already present, and buffer capacitor 4. It is also possible to use an oscillator, which, in a similar way, is provided with supply voltage and supplies an output signal to a transmitting circuit.

Advantageously, however, it is often possible to use the pulse generator of the code circuit, in particular if this pulse generator comprises a frequency divider or an oscillator. If desired, an additional frequency divider or multiplier can be provided between the pulse generator and the transmitting circuit.

FIG. 3 shows a responder 14 with an identification portion comprising the elements 1-4 and 6-8, already shown in FIG. 1. Furthermore, a pulse generator 15 is provided, which corresponds to the pulse generator 5 of FIG. 1 and takes the form of a frequency divider, as shown, or of an oscillator, which on the one hand provides clock pulses for the code circuit 6 and, on the other hand, supplies a pilot signal via a line 13 to a transmitting circuit 11,12.

Figure 8:
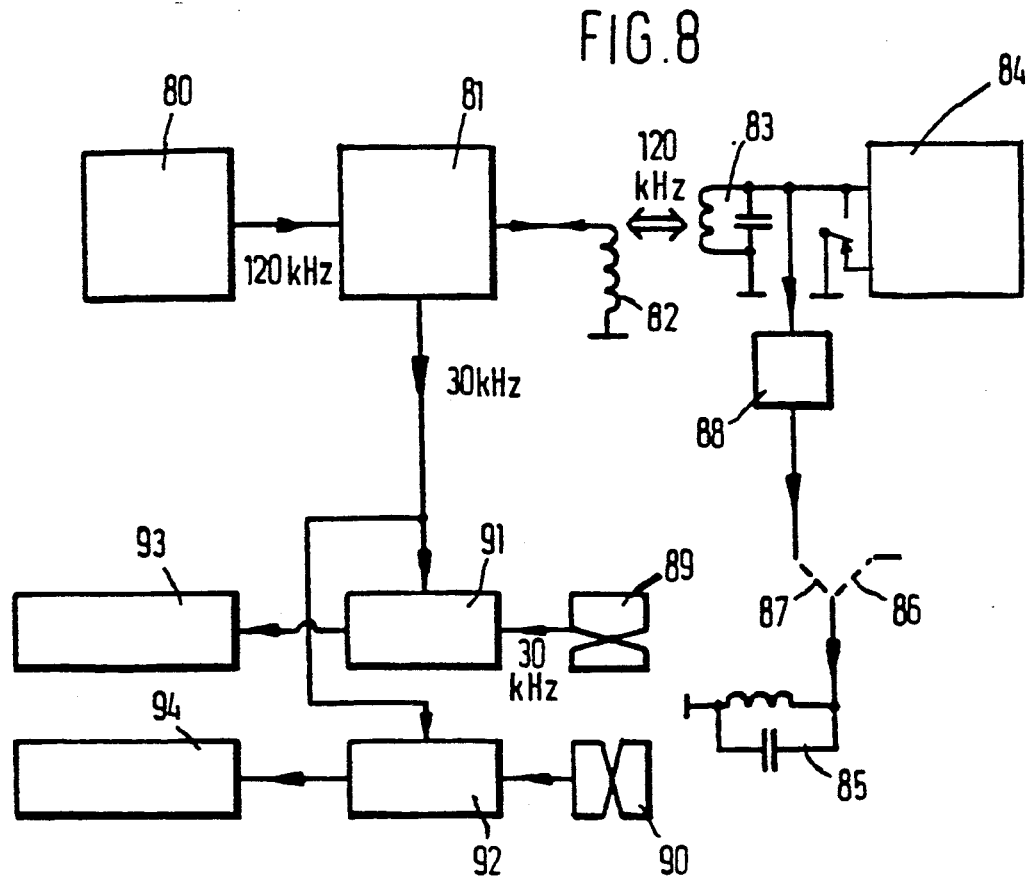
FIG. 8 shows, for the sake of completeness, a block diagram of one example of a system according to the present invention.

To detect this pilot signal and distil an accurate position indication from it, the reader unit (interrogator) is extended with an additional antenna coil in the form of a FIG. 8; additional filter means connected to the primary transmitting coil in order that the pilot signal may also be received by means of the primary transmitting coil, and a phase-sensitive detection circuit, in which the amplitude and phase of the pilot signal from the figure-of-eight coil is determined relative to the pilot signal from the primary transmitting coil. FIG. 3 shows such a reader unit. The operation is as follows: reader unit 30 generates, by means of generator 21, the transmitting signal to interrogate responder 14. The primary antenna coil 26 (tuned to the frequency of the transmitting signal by means of capacitor 23) generates the primary electromagnetic field, from which the responder circuit 2 or the secondary resonance circuit 2, whose coil may be wound on a ferrite rod 1, absorbs energy. Divider 15 divides the frequency of the transmission signal received to provide the pilot signal 13 and the clock signal to read the code circuit 6. The pilot signal and the clock signal may have the same frequency, but alternatively may be very different. For example, divider 15 could first divide the 120 kHz transmission signal by a factor of six, which provides a pilot signal frequency of 20 kHz, and thereafter perform a division by five, which gives the clock frequency of 4 kHz. The pilot signal is supplied to the pilot transmission circuit 12, whose coil may again be wound on a ferrite rod 11, or may be an air coil. The pilot transmission circuit forms an electromagnetic A.C. field in response to the pilot signal, so that A.C. voltages of the pilot signal frequency are induced in both the transmission coil 26 and the coil 31 of figure-of-eight configuration.

FIG. 4 shows the arrangement of the combination of transmission coil 26 and figure-of-eight coil 31, which are arranged concentrically, with the pilot coil of the responder shown below. Point 50 therein is the projection of the centre of the pilot coil on the plane of the eight-shaped coil. When point 50 is in the right-hand portion of the coil, the emf generated in that portion will exceed the emf generated in the left-hand portion. As the two coil portions are series-connected in counterphase, the voltage generated in the left-hand coil portion will be deducted from the voltage in the right-hand portion. As, in the situation shown, the right-hand coil portion will generate a higher voltage than the left-hand portion, the resulting voltage at the terminals will have the phase of the voltage from the right-hand portion.

If now the label with the pilot coil is moved to the left, so that point 50 falls in the left-hand coil portion, the induced voltage in the left-hand coil portion dominates that in the right-hand portion. The phase of the resulting voltage will then be rotated through 180 degrees relative to the first situation. The phase of the voltage generated by the A.C. field of the pilot coil in transmission coil 26, however, is not changed by the above displacement of the pilot coil. The voltage produced by the transmission coil can accordingly be used as a phase reference for a phase sensitive detection of the output voltage of the eight-shaped coil.

The output signal $V_{pilot}$ obtained with such a phase-sensitive detection of the output voltage of the eight-shaped coil, as a function of the location S of the pilot coil, is shown in FIG. 5. So long as the projection of the centre line of the pilot coil on the plane of the figure-of-eight coil falls in the right-hand portion of the coil, the output voltage of the phase detector is positive. Owing to the rotation of the phase through 180 degrees, however, the output voltage will become negative if the projection falls in the left-hand coil portion. If the projection falls right in between the two coil portions, the voltages generated are equal but opposite, so that the sum is zero. The phase-sensitive detector will then indeed indicate zero output voltage.

In the reader unit shown in FIG. 3, a phase-sensitive detector 36 receives the reference signal from the transmission coil 26 via a receiver-amplifier 33 and a filter unit 32. Filter unit 32, as well as a filter unit 34, have the task to block the interrogation signal from the coils and to block other spurious signals from extraneous sources. Via filter unit 34 and a receiver-amplifier 35, the output voltage of the figure-of-eight coil is supplied to the phase-sensitive detector 36. The output voltage 39 of the detector is supplied to a control circuit 40. This control circuit can, for example, control steering motors or other servo devices when an instruction has been given from the identification circuit 25 to address this specific label. The connection to the servo motors is formed by a connector 41; a connector 27, where all control instructions are received, forms the connection between the identification circuit 25 and the outside world.

FIG. 3 shows one figure-of-eight coil with the two loops one above the other. In this arrangement, orientation in one dimension $D_1$, here vertical, is possible. When a second figure-of-eight coil is added, rotated 90 degrees relative to the first, orientation in a second dimension is also possible.

FIG. 6 diagrammatically shows a system arranged for 2-dimensional location and positioning. In addition to the 8-shaped receiving antenna 31, already shown in FIG. 3, a second 8-shaped antenna 41 is provided, which is oriented transverse to the first antenna, so that location and positioning or moving in a second dimension $D_2$ is possible. It is noted that, if desired, a third 8-shaped antenna for location and positioning in a third dimension may be added in a similar manner. If necessary, the form of the transmission coil(s) of the responder transmission circuit can be adapted.

It is further noted that the second 8-shaped coil 41 differs somewhat from a true figure eight, but does possess two loops connected in counter-phase and accordingly has the same operation. In this specification and in the appended claims, such antennas are also referred to as eight-shaped or figure-of-eight antennas or (antenna) coils.

The second receiving coil 41 is connected to an associated filter unit 44, a receiver-amplifier 45, and a phase-sensitive detector 46. The output signals from the phase-sensitive detectors 36 and 46 are again supplied to a control circuit 40, which now provides control signals for 2-dimensional steering to suitable devices.

Figure 7:
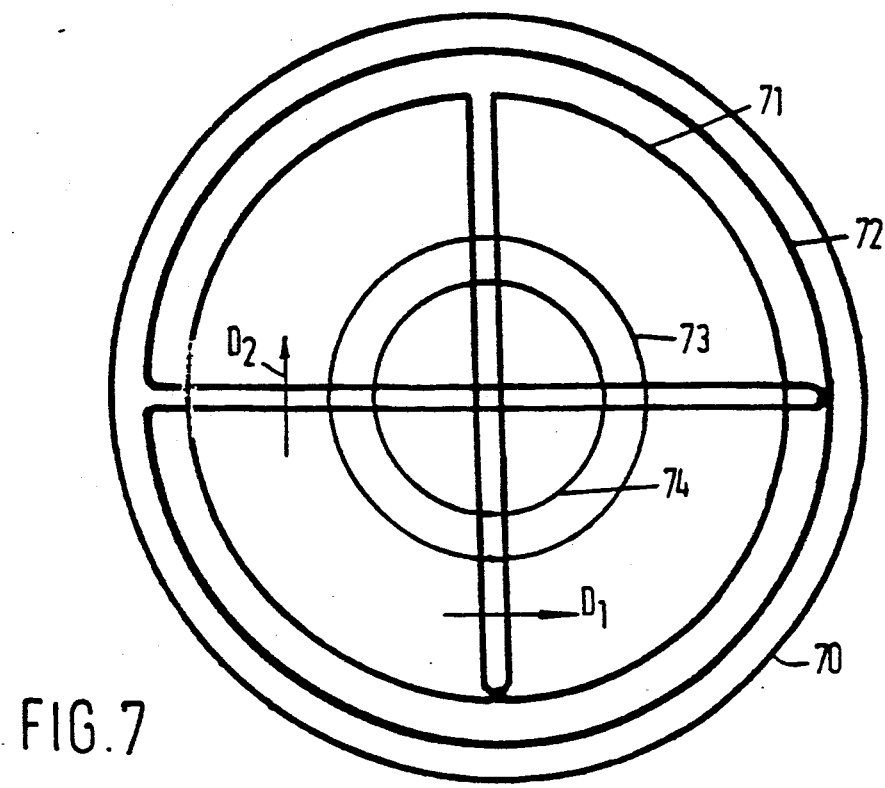
FIG. 7 shows an alternative antenna configuration for a system according to the invention.

FIG. 7 shows diagrammatically an antenna configuration for a system according to the present invention, with a circular transmitting antenna 70, a first 8-shaped antenna 71, located within the transmitting antenna, for location along a first dimension $D_1$, and a second 8-shaped antenna for location along a second dimension $D_2$. FIG. 7 further shows the receiving antenna 73 of the responder receiver circuit and the transmitting antenna 74 of the responder transmitter circuit. The responder antennas, in this example, are mounted in parallel and even co-axial relationship, and are shown in the zero position, that is to say, that the pilot signal generates equal, but opposite signals in the two halves of each antenna.

For the sake of completeness, a block diagram of an apparatus according to this invention is shown in FIG. 8. An interrogator or reader 80 generates via a duplexer 81 and a transmitter coil 82 an interrogation field with a frequency of 120 kHz. A responder comprises a resonance circuit 83, tuned to that frequency, and connected to an integrated circuit 84 in which, during the formation of clock pulses, a frequency division by a factor $N=4$ takes place, in which further, in the manner described hereinbefore, a binary code signal is generated which via a switch means affects the resonance circuit.

There is further provided a pilot signal transmitting circuit 85, which is tuned to a frequency of 30 kHz. The signal supplied to the transmitter circuit 85 can be obtained from the code circuit 84 or from a separate frequency divider 88, as shown by dotted lines 86,87.

The pilot signal is received by two 8-shaped receiving antennas 89,90 of the reader unit, which are oriented transversely to each other. These antennas are also tuned to a frequency of 30 kHz. The pilot signal is also received by the transmitting antenna 82 and, via duplexer 81, supplied as a reference signal to phase comparator circuits 91,92. The output signals from the phase comparator circuits are finally supplied to suitable control devices 93,94.

It is noted that a system according to this invention can be used in both situations in which the responders are present on moving vehicles or means and one or more reader units are stationary, and situations in which one or more reader units are present on moving vehicles or means, while one or more responders are provided at fixed positions.

It will be clear that the use of the present invention is not limited to the Automatic Guided Vehicle Systems. Another example is to be found in special order pickers, automatic machines arranged to pick up materials wound on rolls, such as paper rolls, carpet rolls, etc., from store rooms and to transport these. In these arrangements, a support pin must be inserted into the centre of the roll, and the precise location of that hole is not known.

In principle, the invention is applicable in all those cases where the functions of identification and orientation are combined.

I claim:

1. An electromagnetic identification and locations system, comprising:

at least one interrogator having means for generating an interrogation signal and a position-sensitive antenna arrangement with a primary antenna coil for generating an electromagnetic interrogation field from said interrogation signal and a secondary antenna coil arranged substantially concentrically and being approximately coplanar with said primary antenna coil; and at least one responder, having means for absorbing energy of said electromagnetic interrogation field and providing a transmission signal, generator means for generating a pilot signal and a clock from said transmission signal, a code circuit for receiving said clock signal and generating a code signal, and pilot transmission means for generating an AC field from said pilot signal and inducing an AC voltage, having a frequency the same as that of said AC field, in said primary and secondary antennas to produce a first output signal from said primary antenna coil and a second output signal from said secondary antenna coil;

said interrogator further including identification means for receiving and identifying said code signal from said responder when said responder is present in said interrogation field in order to identify said responder, and a detector for receiving said first output signal and said second output signal to produce a pilot output voltage indicative of a position of said responder relative to said secondary antenna coil.

2. A system as claimed in claim 1, characterized in that the generator means comprise a frequency converter connected to said pilot transmission means.

3. A system as claimed in claim 2, characterized in that the frequency converter is one of a frequency multiplier and frequency divider.

4. A system as claimed in claim 2, characterized in that the frequency converter is an oscillator.

5. A system as claimed in claim 2 in which the responder comprises a resonance circuit tuned to a frequency of the interrogation field.

6. A system as claimed in claim 5, characterized in that the clock signal has a frequency equal to a frequency of the pilot signal.

7. A system as claimed in claim 1, characterized in that the position-sensitive antenna arrangement comprises at least one loop-shaped antenna coil arranged to generate the electromagnetic interrogation field and to receive the code signal from said responder; and at least one eight-shaped antenna coil arranged to receive the pilot signal from said responder.

8. A system as claimed in claim 7, characterized in that the at least one loop-shaped antenna coil encloses said at least one eight-shaped antenna coil.

9. A system as claimed in claim 7, wherein at least two eight-shaped antenna coils are provided, said at least two eight-shaped antenna coils being rotated relative to each other through 90° and each coupled to an associated phase-sensitive detector to determine the position of said responder in at least two dimensions.

10. A system as claimed in claim 7, characterized in that the position-sensitive antenna arrangement comprises first and second eight-shaped antennas and a circular loop antenna having a larger diameter than the first and second eight-shaped antennas, and in that the first and the second eight-shaped antennas are each essentially built up from two semi-circular portions together each forming a circular shape, the first and second eight-shaped antennas having a crossing located in the vicinity of the diameter of the circular loop antenna, and canters of the circular loop antenna and the first and second eight-shaped antennas located in closely spaced relationship on a line extending transversely to a plane of the circular loop-shaped antenna.

* * * * *